(12) United States Patent
Ahn et al.

(10) Patent No.: US 10,075,261 B2
(45) Date of Patent: Sep. 11, 2018

(54) METHOD AND DEVICE FOR PERFORMING HARQ

(71) Applicant: LG ELECTRONICS INC., Seoul (KR)

(72) Inventors: Joonkui Ahn, Seoul (KR); Dongyoun Seo, Seoul (KR); Suckchel Yang, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 15/111,992

(22) PCT Filed: Jan. 15, 2015

(86) PCT No.: PCT/KR2015/000447
§ 371 (c)(1),
(2) Date: Jul. 15, 2016

(87) PCT Pub. No.: WO2015/108356
PCT Pub. Date: Jul. 23, 2015

(65) Prior Publication Data
US 2016/0352471 A1    Dec. 1, 2016

Related U.S. Application Data

(60) Provisional application No. 61/930,484, filed on Jan. 23, 2014, provisional application No. 61/927,999, filed on Jan. 16, 2014.

(51) Int. Cl.
*H04L 1/18*    (2006.01)
*H04L 5/14*    (2006.01)
(Continued)

(52) U.S. Cl.
CPC .......... *H04L 1/1812* (2013.01); *H04L 5/1415* (2013.01); *H04W 72/042* (2013.01); *H04W 72/0413* (2013.01); *H04W 84/042* (2013.01)

(58) Field of Classification Search
CPC ............... H04L 1/1812; H04L 5/1415; H04W 72/0413; H04W 72/042; H04W 84/042
(Continued)

(56) References Cited

U.S. PATENT DOCUMENTS

2013/0343239 A1    12/2013   Damnjanovic et al.
2015/0003302 A1*   1/2015    Ekpenyong ........... H04W 72/14
                                                        370/280
(Continued)

FOREIGN PATENT DOCUMENTS

WO    WO 2013/162261 A1    10/2013

OTHER PUBLICATIONS

LG Electronics, "DL HARQ timing for TDD-FDD carrier aggregation", R1-135465, 3GPP TSG RAN WG1 Meeting #75, San Francisco, USA, Nov. 11-15, 2013, pp. 1-4.
(Continued)

*Primary Examiner* — Obaidul Huq
(74) *Attorney, Agent, or Firm* — Birch, Stewart, Kolasch & Birch, LLP (57) ABSTRACT

Provided are a method for performing a hybrid automatic repeat request (HARQ) in a wireless communication system, and a wireless device using the same. The wireless device receives at least one downlink (DL) transmission block from at least one DL sub-frame in a frequency division duplex (FDD) cell and transmits ACK/NACK corresponding to the at least one DL transmission block from an uplink (UL) HARQ sub-frame in a time division duplex (TDD) cell. The
(Continued)

UL HARQ sub-frame belongs to a subset of a set of UL sub-frames determined according to the UL-DL setting of the TDD cell.

4 Claims, 6 Drawing Sheets

(51) Int. Cl.
*H04W 72/04* (2009.01)
*H04W 84/04* (2009.01)

(58) Field of Classification Search
USPC .......................................... 370/276, 277, 280
See application file for complete search history.

(56) References Cited

U.S. PATENT DOCUMENTS

2015/0085782 A1 3/2015 Seo et al.
2015/0304087 A1* 10/2015 He ........................ H04W 72/12
370/280

OTHER PUBLICATIONS

NEC, "HARQ timing for TDD-FDD CA", R1-135258, 3GPP TSG RAN WG1 Meeting #75, San Francisco, USA, Nov. 11-15, 2013, pp. 1-4 and table 1.
Sharp, "DL scheduling and HARQ-ACK feedback for TDD-FDD CA", R1-135343, 3GPP TSG RAN WG1 Meeting #75, San Francisco, USA, Nov. 11-15, 2013, pp. 1-6.

* cited by examiner

METHOD AND DEVICE FOR PERFORMING HARQ

CROSS REFERENCE TO RELATED APPLICATIONS

This application is the National Phase of PCT International Application No. PCT/KR2015/000447, filed on Jan. 15, 2015, which claims priority under 35 U.S.C. 119(e) to U.S. Provisional Application Nos. 61/927,999, filed on Jan. 16, 2014 and 61/930,484 filed on Jan. 23, 2014, all of which are hereby expressly incorporated by reference into the present application.

BACKGROUND OF THE INVENTION

Field of the Invention

The present invention relates to wireless communications, and more particularly, to a method of performing a hybrid automatic repeat request (HARQ) in a wireless communication system, and an apparatus using the method.

Related Art

Long term evolution (LTE)/-LTE-Advanced (LTE-A) based on 3rd generation partnership project (3GPP) technical specification (TS) releases 8-11 are widely employed mobile communication standard. Recently, next-generation mobile communication with higher efficiency is under standardization.

In a communication system, a duplex scheme includes a time division duplex (TDD) and a frequency division duplex (FDD). The TDD provides an uplink communication and a downlink communication in the same frequency band. The FDD provides the uplink communication and the downlink communication in different frequency bands.

A carrier aggregation (CA) is a technique capable of providing a plurality of component carriers to the UE. Each component carrier may be defined as one cell. When the plurality of component carriers is configured for the UE, the UE may receive services from a plurality of serving cells.

Each serving cell may be configured with the FDD or the TDD. In a carrier aggregation environment, the UE may be configured with a plurality of duplex schemes. For example, if two cells are configured for the UE, the cells may be configured as a TDD cell-TDD cell or a TDD cell-FDD cell. Accordingly, a throughput of the UE may be increased in various network environments.

However, since a plurality of duplex schemes is applied to the UE, there may be a problem in an operation for the downlink communication and the uplink communication.

SUMMARY OF THE INVENTION

The present invention relates to a method of performing a hybrid automatic repeat request (HARQ) in a wireless communication system, and a wireless device using the method.

In an aspect, a method for performing a hybrid automatic repeat request (HARQ) in a wireless communication system is provided. The method includes receiving, by a wireless device, at least one downlink (DL) transport block in at least one DL subframe of a frequency division duplex (FDD) cell, and transmitting, by the wireless device, an ACK/NACK corresponding to the at least one DL transport block in an uplink (UL) HARQ subframe in a time division duplex (TDD) cell.

The UL HARQ subframe may belong to a subset of a UL subframe set determined according to the UL-DL configuration of the TDD cell.

In another aspect, a device for performing a hybrid automatic repeat request (HARQ) in a wireless communication system is provided. The device includes a radio frequency (RF) unit configured to transmit and receive a radio signal, and a processor operatively coupled to the RF unit. The processor is configured to control the RF unit to receive at least one downlink (DL) transport block in at least one DL subframe of a frequency division duplex (FDD) cell, and control the RF unit to transmit an ACK/NACK corresponding to the at least one DL transport block through the RF unit in an uplink (UL) HARQ subframe in a time division duplex (TDD) cell.

Proposed is a timing for performing a hybrid automatic repeat request (HARQ) in a state where a plurality of serving cells having various duplex mechanisms are configured.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE)/LTE-advanced (LTE-A) based on 3GPP TS releases 8-11. This is for exemplary purposes only, and the present invention is also applicable to various wireless communication systems. In the following description, LTE and/or LTE-A are collectively referred to as LTE.

A wireless device may be served by a plurality of serving cells. Each serving cell may be defined by a downlink (DL) component carrier (CC) or a pair of a DL CC and an uplink (UL) CC.

A serving cell may be classified into a primary cell and a secondary cell. The primary cell operates at a primary frequency, performs an initial connection establishment procedure, initiates a connection reestablishment procedure or is designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by a upper layer signaling (e.g. RRC message).

A cell index (CI) of the primary cell may be fixed. For example, lowest CI may be set as the CI of the primary cell. Hereinafter, the CI of the primary cell is set to zero and the CI of a secondary cell may be assigned subsequently starting from one.

Figure 1:
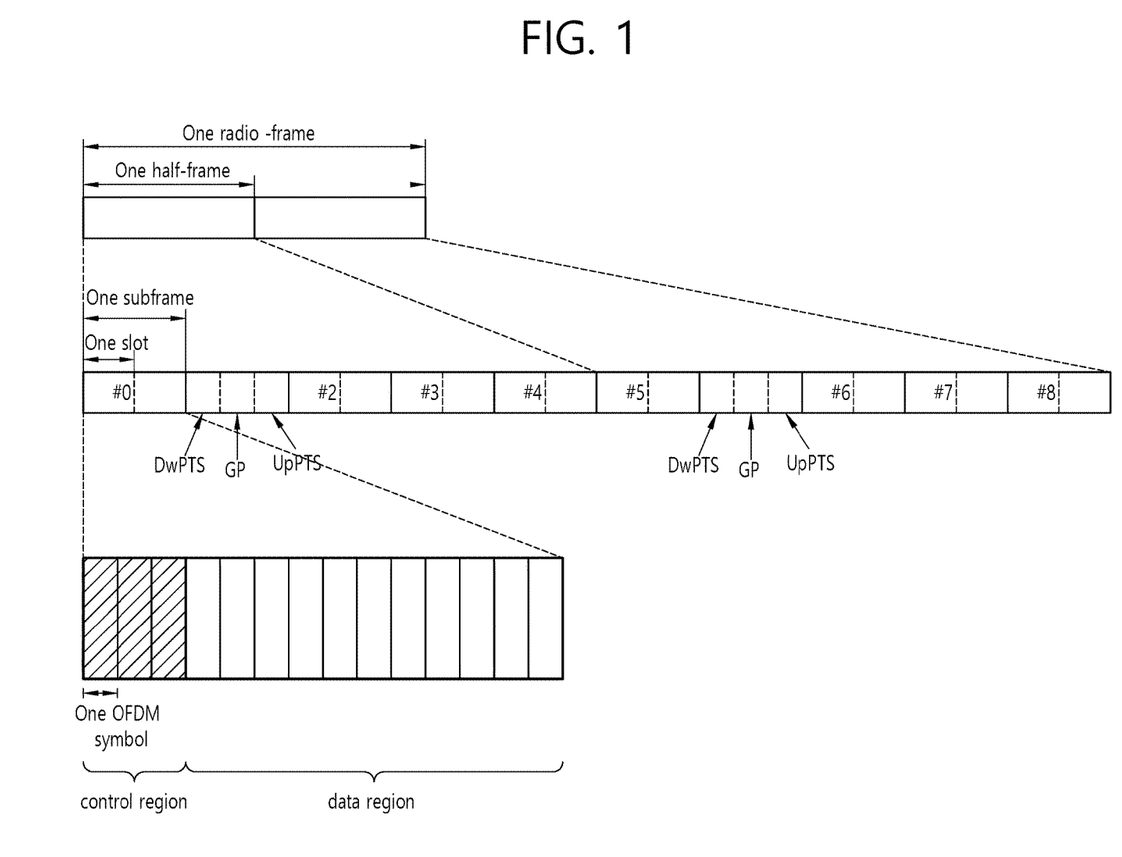
FIG. 1 shows a structure of a downlink radio frame in 3rd generation partnership project (3GPP) long term evolution (LTE).

FIG. 1 shows a structure of a downlink radio frame in 3GPP LTE-A. The section 6 of 3GPP TS 36.211 V11.2.0 (2013-02) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

Subframes having indexes #1 and #6 are called as special (S) subframes. A S subframe may include a downlink pilot time slot (DwPTS), a guard period (GP) and a uplink pilot time slot (UpPTS). The DwPTs may be used for initial cell search, synchronization and channel estimation. The UpPTS may be used for channel estimation at a BS, uplink synchronization at a wireless device. The GP, also called as a gap, may be a duration to mitigate uplink interference due to multi-path delay of a downlink signal between downlink and uplink.

In TDD, a subframe may be a DL subframe or a UL subframe. Table 1 shows an example of radio frame configuration.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe and 'S' denotes a S subframe. When a UL-DL configuration is received from a BS, a wireless device can know which subframe is a DL subframe or a DL subframe in accordance with the UL-DL configuration.

A DL subframe is divided into a control region and a data region in the time domain. The control region includes up to first three OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

DL control channels are described as follows.

As disclosed in 3GPP TS 36.211 V11.2.0, the 3GPP LTE/LTE-A classifies a physical control channel into a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

To reduce a burden due to a blind decoding, 3GPP LTE uses a search space. The search space may be a CCE monitoring set for the PDCCH. A wireless device can monitor a PDCCH in the search space. The search space can be classified into a common search space (CSS) and a UE-specific search space (USS).

In 3GPP LTE, uplink channels include a physical uplink control channel (PUCCH) and a physical uplink shared channel (PUSCH).

Now, an HARQ performed in 3GPP LTE is described.

At present, in the 3GPP LTE, a DL HARQ uses an asynchronous HARQ mechanism, and a UL HARQ uses a synchronous HARQ mechanism.

When a PUSCH is transmitted in a subframe n, the following timing needs to be considered in the UL HARQ.

(1) k: a subframe n−k in which a PDCCH for carrying a UL grant for scheduling of the PUSCH is transmitted.

(2) j: a subframe n+j in which a PHICH for carrying ACK/NACK corresponding to the PUSCH is transmitted.

(3) r: a subframe n+j+r in which a retransmission PUSCH corresponding to the PHICH is transmitted.

Figure 2:
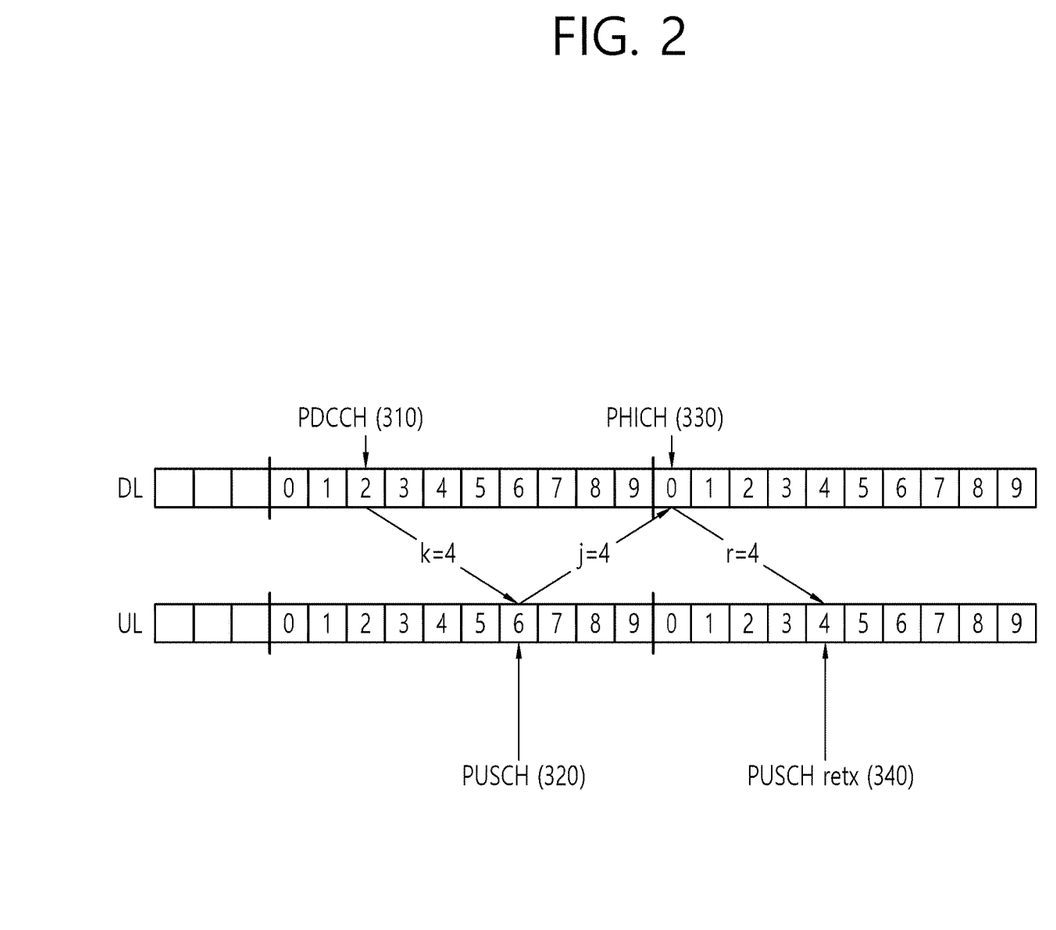
FIG. 2 shows an example of performing an uplink (UL) hybrid automatic repeat request (HARQ) in frequency division duplex (FDD).

FIG. 2 shows an example of performing a UL HARQ in FDD.

A wireless device receives a UL grant on a PDCCH 310 in a DL subframe n−k. The wireless device transmits a UL transport block in a subframe n on a PUSCH 320 indicated by the UL grant.

The wireless device receives an ACK/NACK signal for the UL transport block on a PHICH 330 in a subframe n+j. The ACK/NACK signal may be a reception acknowledgement for the UL transport block. The ACK/NACK signal becomes an ACK signal when the UL transport block is successfully decoded, and becomes an NACK signal when the DL transmission block fails in decoding. When the NACK signal is received, a BS may retransmit the DL transport block until the ACK signal is received or by up to the maximum number of retransmission attempts.

If the ACK/NACK signal is NACK, the wireless device performs retransmission on the PUSCH in a subframe n+j+r.

In FDD, a timing interval for transport block-->ACK/NACK-->retransmission is constant as 4 subframes. That is, k=j=r=4.

Figure 3:
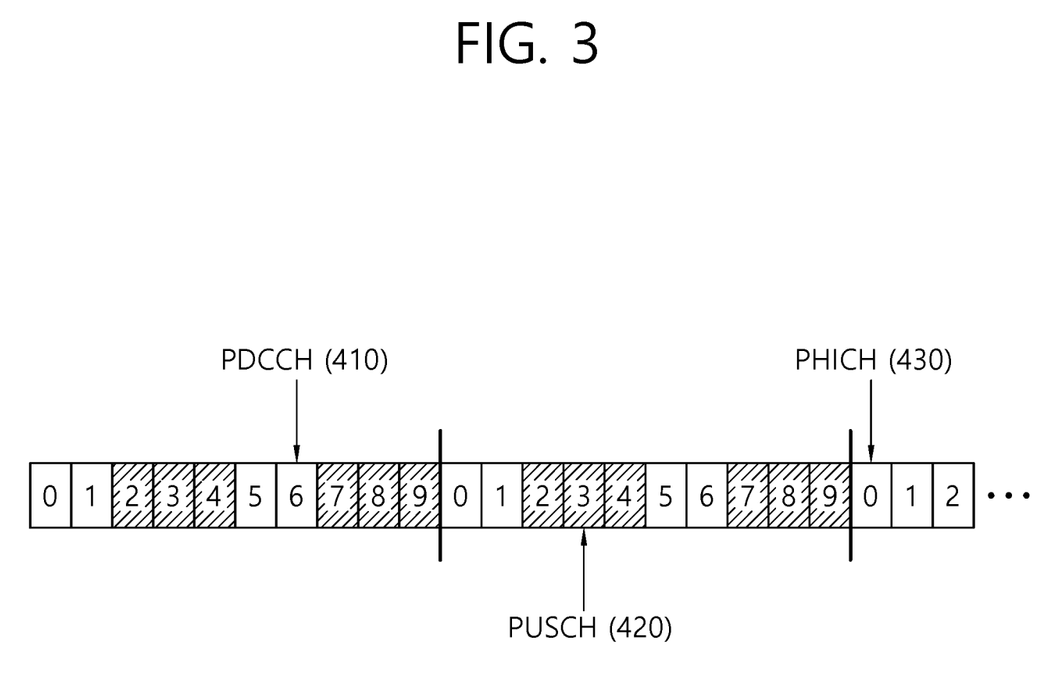
FIG. 3 shows an example of performing a UL HARQ in time division duplex (TDD).

FIG. 3 shows an example of performing a UL HARQ in TDD.

In case of TDD, a DL subframe and a UL subframe are selected according to a UL-DL configuration of Table 1, and there is a case where a ratio thereof is not matched to 1:1. Therefore, k, j, and r are not fixed.

The following table shows k for a subframe n−k in which a PDCCH corresponding to a PUSCH of a subframe n is transmitted in 3GPP LTE.

TABLE 2

| UL-DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 7/6 | 7 | 4 | — | — | 7/6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

FIG. 3 shows a case where a UL-DL configuration corresponds to 0, and n=3. A PDCCH 410 having a UL grant is received in a subframe n−k, and a PUSCH 420 is transmitted in a subframe n. ACK/NACK is received on a PHICH 430 in a subframe n+r.

Figure 4:
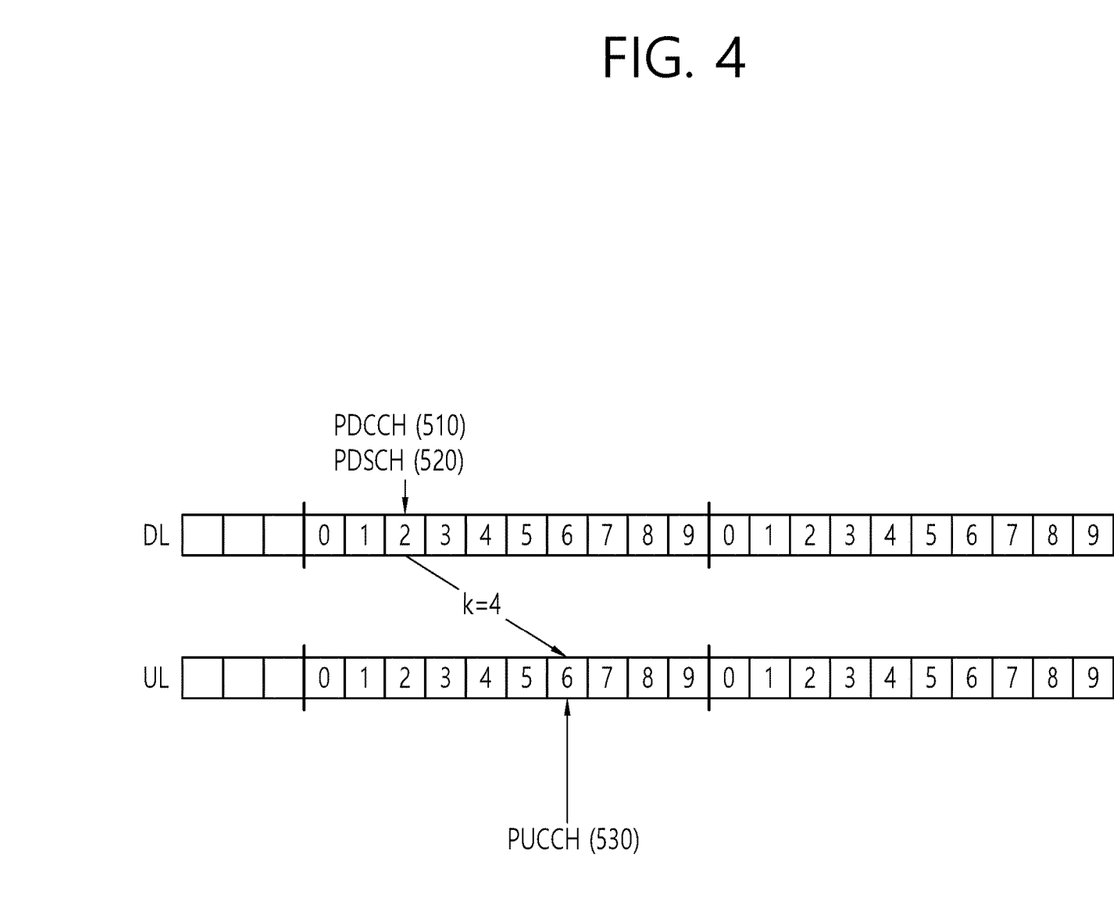
FIG. 4 shows an example of performing a downlink (DL) HARQ in FDD.

FIG. 4 shows an example of performing a DL HARQ in FDD.

In the DL HARQ, there is a need to define a timing between a subframe n−k in which a PDCCH for carrying a DL grant for scheduling of the PDSCH is detected and a subframe n in which corresponding ACK/NACK is transmitted.

In FDD, it is fixed as n=4. For example, if a PDCCH 510 and a PDSCH 520 corresponding thereto are detected in a subframe 2, ACK/NACK is transmitted through a PUCCH 530 in a subframe 6.

In TDD, when PDSCH transmission is detected in a subframe n−k (k∈K), ACK/NACK for a corresponding transport block(s) is transmitted in a subframe n. K is defined as shown in the following table.

TABLE 3

| UL-DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Under a network environment in which carrier aggregation (CA) is supported, a wireless device may be configured of not only a time division duplex (TDD) cell-TDD cell or a frequency division duplex (FDD) cell-FDD cell but also a TDD cell-FDD cell. The TDD cell is a cell in which TDD is configured, and the FDD cell is a cell in which FDD is configured. When multiple duplex schemes are applied to the wireless device, it is called TDD-FDD CA for convenience. Accordingly, a DL/UL peak throughput can be significantly improved.

The carrier aggregation may support cross-carrier scheduling or non cross-carrier scheduling. In the cross-carrier scheduling, a scheduling cell and a scheduled cell are different. The scheduling cell is a cell for monitoring and receiving a DL control channel (e.g., PDCCH), and the scheduled cell is a cell for receiving or transmitting a PDSCH/PUSCH scheduled by the DL control channel. When the cross carrier scheduling is configured, DL control information in the DL control channel may include a DL/UL grant and a carrier indicator field (CIF) indicating the scheduled cell. In the non cross-carrier scheduling, the scheduling cell and the scheduled cell are identical.

In 3GPP LTE, only the same frame structure type cell can be aggregated. Further, if a plurality of TDD cells are aggregated, only the same configuration is used among the UL-DL configurations of Table 1. If the aggregated cells use the same UL-DL configuration or uses the non cross-carrier scheduling, the synchronous HARQ-type resource allocation and retransmission timing interval used in the conventional TDD may also be applied without alteration.

However, as TDD-FDD CA is supported, the conventional HARQ timing may not be applied. For example, it is assumed that a primary cell is an FDD cell, and a secondary cell is a TDD cell. ACK/NACK corresponding to a PDSCH of an FDD secondary cell must be sent to a TDD primary cell, and thus an HARQ timing fixed to the conventional k=4 may not be applied. This is because a subframe for sending ACK/NACK may be a UL subframe or a DL subframe according to a UL-DL configuration. Therefore, there is a need to design a UL/DL HARQ timing for the TDD-FDD CA.

A case where a TDD cell is a primary cell and an FDD cell is a secondary cell is described hereinafter. The number of serving cells is exemplary purposes only, and a plurality of TDD cells and a plurality of FDD cells may be configured for the wireless device.

Figure 5:
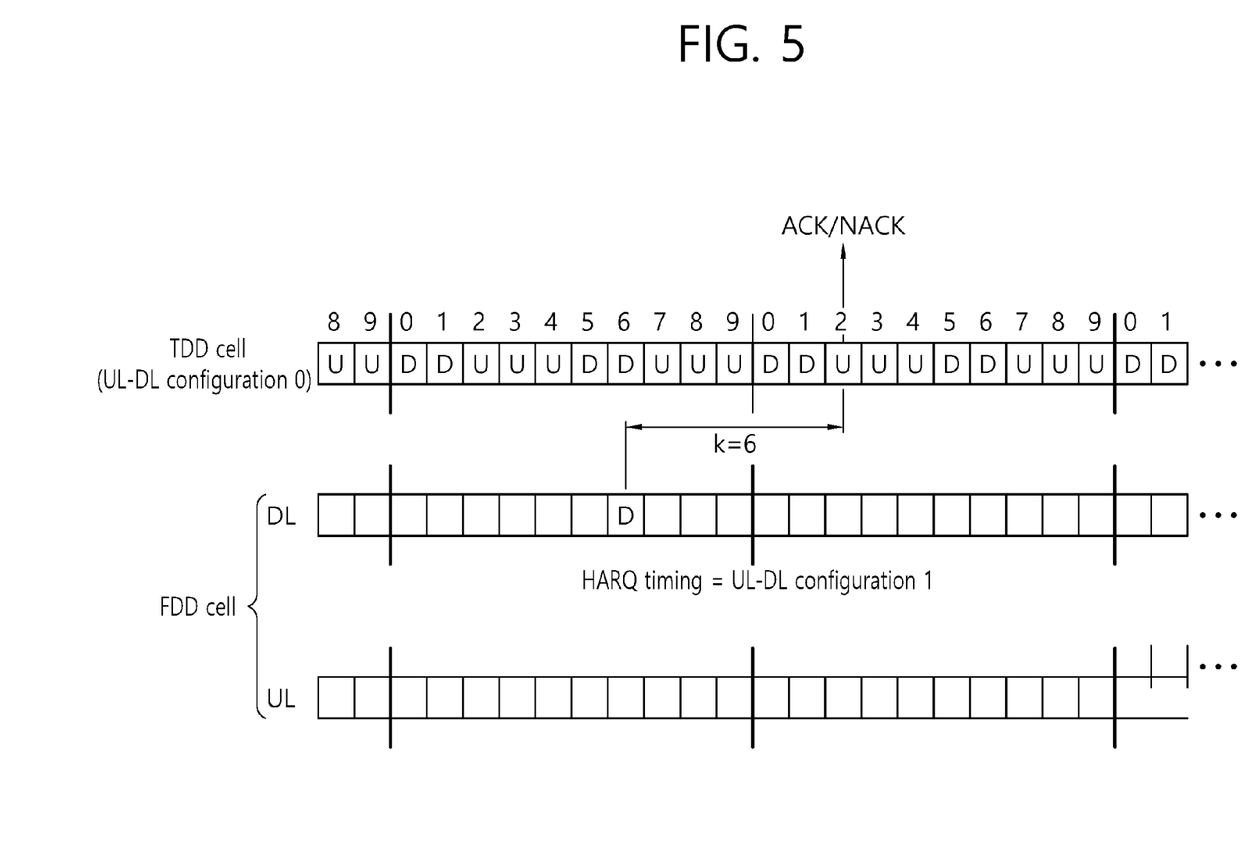
FIG. 5 shows an operation of performing an HARQ according to an embodiment of the present invention.

FIG. 5 shows an operation of performing an HARQ according to an embodiment of the present invention.

A TDD cell is a primary cell, and an FDD cell is a secondary cell. It is assumed that a UL-DL configuration is set to 0 for the TDD cell, ACK/NACK corresponding to a PDSCH/PDCCH of the secondary cell is transmitted in a UL subframe of the primary cell. ACK/NACK for a PDSCH scheduled in a DL subframe of the FDD cell is transmitted on a PUCCH or PUSCH in a UL subframe of the TDD cell.

When ACK/NACK is transmitted in a UL subframe n of the TDD primary cell, a (DL) HARQ timing of the FDD secondary cell may be for determining a DL subframe n−k of the FDD secondary cell in which the wireless device receives the PDSCH. A UL subframe set of the TDD primary cell used in ACK/NACK transmission of the FDD secondary cell is called an HARQ subframe set. A UL subframe belonging to the HARQ subframe set is called an HARQ subframe.

According to the proposed embodiment, the HARQ timing of the FDD secondary cell may be determined by considering a subset of a subframe(s) defined as a UL subframe by the UL-DL configuration of the TDD primary cell.

As shown in FIG. 5, it is assumed that the UL-DL configuration 0 is configured in the TDD primary cell. A virtual UL-DL configuration may be given to designate the HARQ timing of the FDD secondary cell (this is called a virtual UL-DL configuration). The virtual UL-DL configuration is for giving an HARQ timing of a corresponding cell as the UL-DL configuration. The virtual UL-DL configuration may be selected from UL-DL configurations in which a UL subframe is defined as a subset of a UL subframe set of the UL-DL configuration of the primary cell (this is called a candidate UL-DL configuration). When the UL-DL configuration 0 is configured in the TDD primary cell, the candidate UL-DL configuration may correspond to 0 to 6. If the TDD primary cell is configured as the UL-DL configuration 3, the candidate UL-DL configuration applicable to the FDD secondary cell may be the UL-DL configurations 3, 4, and 5.

It is assumed herein that the UL-DL configuration 1 is configured as the virtual UL-DL configuration of the FDD secondary cell. According to the timing of Table 3, ACK/NACK of the UL subframe 2 of the TDD cell corresponds to a PDSCH received in the DL subframe 6 in a previous radio frame of the FDD cell.

When the UL-DL configuration 1 is configured as the virtual UL-DL configuration, the HARQ may be performed in a DL subframe {0, 1, 4, 5, 6, 9} on a DL carrier of the FDD secondary cell. As to a PDSCH scheduled in a DL subframe {2, 3, 7, 8} on the DL carrier of the FDD secondary cell, ACK/NACK cannot be transmitted in the TDD primary cell, and thus the HARQ is not performed. The wireless device may not expect to receive the PDSCH in the DL subframe {2, 3, 7, 8} on the DL carrier of the FDD secondary cell. The wireless device may not perform detection of the PDCCH in the DL subframe {2, 3, 7, 8} on the DL carrier of the FDD secondary cell. Alternatively, even if the PDSCH is scheduled in the DL subframe {2, 3, 7, 8} on the DL carrier of the FDD secondary cell, the wireless device may not transmit ACK/NACK.

In a UL subframe in which ACK/NACK transmission is not defined according to the virtual UL-DL configuration, the wireless device may not transmit ACK/NACK even if the PDSCH is received in a corresponding DL subframe. Alternatively, the wireless device may not perform PDSCH/PDCCH reception/detection in the corresponding UL subframe.

Indication information regarding the virtual UL-DL configuration for determining the HARQ timing applied to the FDD secondary cell may be signaled through an RRC/MAC message or the like from a BS. The indication information may be signaled by using the UL-DL configuration or a subset of the UL subframe.

If the HARQ timing of the FDD secondary cell is determined without consideration of the UL-DL configuration of the TDD primary cell, ACK/NACK feedback may not be transmitted in the TDD primary cell. As a result, a problem may occur in which PDCCH/PDCCH scheduling becomes complex or the HARQ does not operate. According to the proposed embodiment, the HARQ timing of the FDD secondary cell is determined according to the UL-DL configuration of the TDD primary cell.

If the UL-DL configuration 0 is configured as the virtual UL-DL configuration of the FDD secondary cell and if the HARQ timing of the Table 3 is applied, ACK/NACK for the DL subframe {0, 1, 5, 6} is transmitted in the UL subframe {2, 4, 7, 9}. The UL subframe {3, 8} is not used in ACK/NACK transmission. This implies that ACK/NACK cannot be transmitted in the TDD primary cell even if the UL subframe {3, 8} is included in the HARQ subframe set. The ACK/NACK may not be transmitted as to a subframe in which ACK/NACK transmission is not possible even if it is designated as a UL subframe according to the virtual UL-DL configuration. The wireless device may not attempt to detect the PDCCH/PDSCH in a DL subframe corresponding to the UL subframe {3, 8} or may not perform HARQ even if the PDCCH/PDSCH is received.

A UL subframe not used in ACK/NACK transmission in the TDD primary cell is not used in ACK/NACK transmission for the FDD secondary cell. The virtual UL-DL configuration for defining the HARQ timing for the FDD secondary cell may be limited to a UL-DL configuration which excludes a UL subframe not used in ACK/NACK transmission. For example, when the TDD primary cell is configured as the UL-DL configuration 0, the virtual UL-DL configuration for the FDD secondary cell may be limited to one of the UL-DL configurations 0, 2, and 5.

Now, an HARQ timing configuration considering the number of ACK/NACK bits is described.

In TDD, since the number of UL subframes is less than the number of DL subframes in general, one or more DL subframes may be associated with ACK/NACK transmitted in one UL subframe. For example, as shown in Table 3, up to 4 DL subframes are associated with the UL subframe 2 in the UL-DL configuration 2. When one ACK/NACK bit corresponds to one PDSCH, up to 4-bit ACK/NACK may be transmitted in the UL subframe 2.

First, it is assumed that the HARQ timing of the FDD secondary cell is applied by considering the HARQ timing of the TDD primary cell. The UL-DL configuration of the FDD secondary cell may be designated as one of UL-DL configurations having the greater number of ACK/NACK bits and supporting the greater number of DL subframes (this is called a candidate UL-DL configuration).

It is assumed that two UL-DL configurations have the same maximum number of ACK/NACK bits, and the number of DL subframes supported by the two UL-DL configurations is different. The UL-DL configuration supporting the smaller number of UL subframes is preferably not selected as the candidate UL-DL configuration. This is because the same maximum number of ACK/NACK bits may imply the same ACK/NACK transmission coverage, and if the smaller number of DL subframes are supported while supporting the same ACK/NACK transmission coverage, complexity against usefulness may be much greater.

This method is applied to 3GPP LTE TDD-FDD CA as follows.

The number of supportable DL subframes and the maximum number of ACK/NACK bits for each UL-DL configuration are as follows.

TABLE 4

| UL-DL configuration | The number of supported DL subframes | The maximum number of ACK/NACK bits per subframe |
| --- | --- | --- |
| 0 | 4 | 1 |
| 1 | 6 | 2 |
| 2 | 8 | 4 |
| 3 | 7 | 3 |
| 4 | 8 | 4 |
| 5 | 9 | 9 |
| 6 | 5 | 1 |

The candidate UL-DL configuration based on a UL-DL configuration of each TDD primary cell is as follows.

TABLE 5

| UL-DL configuration of TDD primary cell | Candidate UL-DL configuration for secondary cell |
| --- | --- |
| 0 | 0, 1, 2, 3, 4, 5, 6 |
| 1 | 1, 2, 4, 5 |
| 2 | 2, 5 |
| 3 | 3, 4, 5 |
| 4 | 4, 5 |
| 5 | 5 |
| 6 | 1, 2, 3, 4, 5, 6 |

The UL-DL configurations 2 and 4 support the same number of DL subframes and the same maximum number of ACK/NACK bits. When only one of the two is allowed, the applicable UL-DL configurations correspond to 1, 3, 4, 5, 6 or 1, 2, 3, 5, 6. The following table shows the candidate UL-DL configuration based on the UL-DL configuration of each TDD primary cell.

TABLE 6

| UL-DL configuration of TDD primary cell | Candidate UL-DL configuration for secondary cell |
| --- | --- |
| 0 | 0, 1, 3, 4, 5, 6 |
| 1 | 1, 4, 5 |
| 2 | 2, 5 |
| 3 | 3, 4, 5 |
| 4 | 4, 5 |
| 5 | 5 |
| 6 | 1, 3, 4, 5, 6 |

TABLE 7

| UL-DL configuration of TDD primary cell | Candidate UL-DL configuration for secondary cell |
| --- | --- |
| 0 | 0, 1, 2, 3, 5, 6 |
| 1 | 1, 2, 5 |
| 2 | 2, 5 |
| 3 | 3, 4, 5 |
| 4 | 4, 5 |
| 5 | 5 |
| 6 | 1, 2, 3, 5, 6 |

The UL-DL configuration 0 and the UL-DL configuration 6 may be excluded from the candidate UL-DL configuration since efficiency deteriorates relatively. This is summarized by the following table from a perspective of Table 5 to FIG. 7.

TABLE 8

| UL-DL configuration of TDD primary cell | Candidate UL-DL configuration for secondary cell |
| --- | --- |
| 0 | 1, 2, 3, 4, 5 |
| 1 | 1, 2, 4, 5 |
| 2 | 2, 5 |
| 3 | 3, 4, 5 |
| 4 | 4, 5 |
| 5 | 5 |
| 6 | 1, 2, 3, 4, 5 |

TABLE 9

| UL-DL configuration of TDD primary cell | Candidate UL-DL configuration for secondary cell |
| --- | --- |
| 0 | 1, 3, 4, 5 |
| 1 | 1, 4, 5 |
| 2 | 2, 5 |
| 3 | 3, 4, 5 |
| 4 | 4, 5 |
| 5 | 5 |
| 6 | 1, 3, 4, 5 |

TABLE 10

| UL-DL configuration of TDD primary cell | Candidate UL-DL configuration for secondary cell |
| --- | --- |
| 0 | 1, 2, 3, 5 |
| 1 | 1, 2, 5 |
| 2 | 2, 5 |
| 3 | 3, 4, 5 |
| 4 | 4, 5 |

TABLE 10-continued

| UL-DL configuration of TDD primary cell | Candidate UL-DL configuration for secondary cell |
|---|---|
| 5 | 5 |
| 6 | 1, 2, 3, 5 |

If the HARQ timing of the FDD secondary cell is not designated, the wireless device may apply the HARQ timing based on the UL-DL configuration of the TDD primary cell to the FDD secondary cell. For example, if signaling indicating the HARQ timing of the FDD secondary cell is not given, the wireless device may apply the HARQ timing based on the UL-DL configuration of the TDD primary cell as a default timing.

Although a case of the FDD primary cell and the FDD secondary cell is described in the aforementioned embodiment, an embodiment of the present invention may be applied to various CA environments. The present embodiment is applicable when ACK/NACK corresponding to DL transmission in a first serving cell (or a first carrier) is transmitted in a second serving cell (or a second carrier) and an HARQ timing of the first serving cell is determined in association with a UL-DL configuration of the second serving cell.

Figure 6:
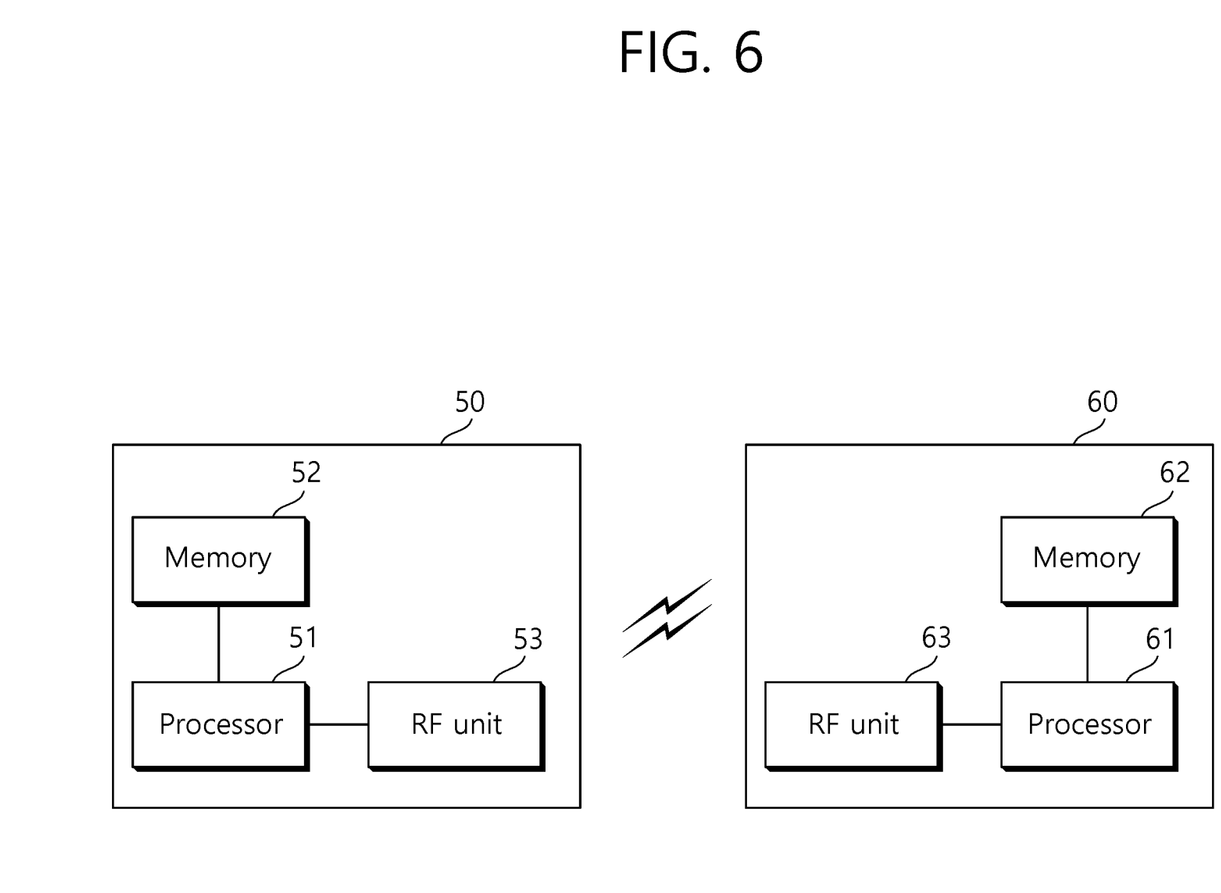
FIG. 6 is a block diagram showing a wireless communication system according to an embodiment of the present invention.

FIG. 6 is a block diagram showing a wireless communication system according to an embodiment of the present invention.

A BS 50 includes a processor 51, a memory 52, and a radio frequency (RF) unit 53. The memory 52 is coupled to the processor 51 to store a variety of information for driving the processor 51. The RF unit 53 is coupled to the processor 51 to transmit and/or receive a radio signal. The processor 51 implements the proposed functions, procedures, and/or methods. In the aforementioned embodiment, an operation of the BS or a cell may be implemented by the processor 51.

A wireless device 60 includes a processor 61, a memory 62, and an RF unit 63. The memory 62 is coupled to the processor 61 to store a variety of information for driving the processor 61. The RF unit 63 is coupled to the processor 61 to transmit and/or receive a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a hybrid automatic repeat request (HARQ) in a wireless communication system, the method comprising:
   receiving, by a wireless device that is served by a time division duplex (TDD) primary cell and a frequency division duplex (FDD) secondary cell, indication information including a virtual uplink (UL)-downlink (DL) configuration for the FDD secondary cell from the TDD primary cell,
   wherein the virtual UL-DL configuration is preset based on UL subframes indicated by a UL-DL configuration for the TDD primary cell;
   receiving, by the wireless device, a DL transport block corresponding to a physical downlink shared channel (PDSCH) in a DL subframe of the FDD secondary cell,
   wherein the DL subframe corresponds to one of DL subframes indicated by the virtual UL-DL configuration; and
   transmitting, by the wireless device, a positive-acknowledgement (ACK)/negative-acknowledgement (NACK) corresponding to the DL transport block in a UL HARQ subframe of the TDD primary cell,
   wherein the UL HARQ subframe is a subframe allowed by the TDD primary cell among UL subframes indicated by the virtual UL-DL configuration.

2. The method of claim 1,
   wherein each of the DL subframes corresponds to each of a plurality of DL transport blocks, and
   wherein the ACK/NACK corresponds to each of the plurality of DL transport blocks.

3. A device for performing a hybrid automatic repeat request (HARQ) in a wireless communication system, the device being served by a time division duplex (TDD) primary cell and a frequency division duplex (FDD) secondary cell, the device comprising:
   a radio frequency (RF) unit configured to transmit and receive a radio signal; and
   a processor operatively coupled to the RF unit and configured to:
      control the RF unit to receive indication information including a virtual uplink (UL)-downlink (DL) configuration for the FDD secondary cell from the TDD primary cell,
      wherein the virtual UL-DL configuration is preset based on UL subframes indicated by a UL-DL configuration of the TDD primary cell,
      control the RF unit to receive a DL transport block corresponding to a physical downlink shared channel (PDSCH) in a DL subframe of the FDD secondary cell, wherein the DL subframe corresponds to one of DL subframes indicated by the virtual UL-DL configuration, and
      control the RF unit to transmit a positive-acknowledgement (ACK)/negative-acknowledgement (NACK) corresponding to the DL transport block in a UL HARQ subframe of the TDD primary cell,
      wherein the UL HARQ subframe is a subframe allowed by the TDD primary cell among UL subframes indicated by the virtual UL-DL configuration.

4. The device of claim 3,
wherein each of the DL subframes corresponds to each of a plurality of DL transport blocks, and
wherein the ACK/NACK corresponds to each of the plurality of DL transport blocks.

* * * * *